United States Patent
Kratz et al.

(10) Patent No.: US 10,008,243 B1
(45) Date of Patent: Jun. 26, 2018

(54) SYSTEM AND METHODS FOR AUTHORING AND RENDERING THERMAL OUTPUT DURING VIDEO PLAYBACK ON COMPUTER DISPLAYS WITH THERMAL OUTPUT CAPABILITY

(71) Applicant: FUJI XEROX CO., LTD., Tokyo (JP)

(72) Inventors: Sven Kratz, San Jose, CA (US); Anthony Dunnigan, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/377,966

(22) Filed: Dec. 13, 2016

(51) Int. Cl.
*H04N 5/932* (2006.01)
*G11B 27/34* (2006.01)
*H04N 5/765* (2006.01)
*H04N 5/93* (2006.01)
*G06F 3/01* (2006.01)

(52) U.S. Cl.
CPC .......... *G11B 27/34* (2013.01); *G06F 3/016* (2013.01); *H04N 5/765* (2013.01); *H04N 5/9305* (2013.01)

(58) Field of Classification Search
CPC .......... G11B 27/34; G06F 3/016; H04N 5/765
USPC ........................................ 386/201
See application file for complete search history.

(56) References Cited

U.S. PATENT DOCUMENTS

| | | | | |
|---|---|---|---|---|
| 2007/0271042 | A1* | 11/2007 | Griffin | B01L 7/52 702/20 |
| 2014/0072284 | A1* | 3/2014 | Avrahami | G06F 17/30817 386/285 |
| 2015/0124102 | A1* | 5/2015 | Frost | H04N 5/33 348/165 |
| 2017/0242291 | A1* | 8/2017 | Rakshit | H04N 5/64 |

OTHER PUBLICATIONS

Jones, Lynette A., and Ho, Hsin-Ni. "Warm or cool, large or small? The challenge of thermal displays." IEEE Transactions on Haptics 1.1 (2008): 53-70.

MacLean, Karon E., and Roderick,Jayne B. "Smart tangible displays in the everyday world: a haptic door knob." Advanced Intelligent Mechatronics, 1999. Proceedings. 1999 IEEE/ASME International Conference on. IEEE, 1999.

Kushiyama, Kumiko, et al. "Thermoesthesia: about collaboration of an artist and a scientist." ACM SIGGRAPH 2006 Educators program. ACM, 2006.

Kushiyama, Kumiko, Tetsuaki Baba, Kouki Doi, and Shinji Sasada. 2010. "Thermo-Pict Neo". Proceedings of SIGGRAPH 10 (2010), 1-1.

* cited by examiner

Primary Examiner — Thai Tran
Assistant Examiner — Jose Mesa
(74) Attorney, Agent, or Firm — Procopio, Cory, Hargreaves & Savitch LLP (57) ABSTRACT

Example implementations are directed to a system to generate keyframes describing the temperature output state of thermal output devices during the synchronous playback of video material. This additional haptic output channel augments the existing audio and video channels. Example (Continued)

implementations provide a manual keyframe authoring interface and an architecture for playing back video with a thermal output channel. Example implementations also involve an automatic keyframe generation method for thermal output accompanying a video, and provide a temperature profile function to enable rapid changing between temperature values for thermal output devices that use open-loop control.

18 Claims, 8 Drawing Sheets

FIG. 1

```
{"videoSource": "coffe_draw.mp4",  ←——— Source video filename
                                         201
"keyFrameList":
[{"id": 0, ←————————————————————————— Keyframe ID
                                         202
"gridState": [28, 27, 23, 23, 42, 43,
32, 21, 34, 37, 36, 25, 40, 39, 30, 23], ←— Grid Temperature Output Values
                                             203
"
time": 0.0}, ←———————————————————————— Corresponding time in Video
                                         204
. . .
]}
```

SYSTEM AND METHODS FOR AUTHORING AND RENDERING THERMAL OUTPUT DURING VIDEO PLAYBACK ON COMPUTER DISPLAYS WITH THERMAL OUTPUT CAPABILITY

BACKGROUND

Field

The present disclosure is generally directed to display systems, and more specifically, to systems and methods for rendering and authoring haptic (e.g., thermal) output for video playback on display systems having haptic output capabilities.

Related Art

In related art implementations, there are surface computing systems that are capable of changing their surface temperature at discrete locations. In such related art implementations, thermal pixels can be arranged in a grid, upon which visual content can be projected.

In additional related art implementations, there are video displays with an additional thermal haptic feedback channel that is realized through changing the temperature of thermal pixels that are coincident with visual display pixels.

SUMMARY

In related art implementations of video playback formats, there is no metadata that can be used to render thermal output at the time of video playback. Example implementations involve a system configured to facilitate the creation and application of thermal metadata to augment videos with a thermal output channel.

Example implementations of the present disclosure involve a system that facilitates the editing of keyframe data that defines the thermal output characteristics over time of a thermal output device during video playback. Such systems in the example implementations can involve a software architecture that allows substantially simultaneous editing of keyframe information for video with a thermal output channel, and video viewing with thermal output on a thermal display device.

Example implementations may also involve algorithms for automatically generating keyframes for a thermal output channel. The algorithm can be configured to extract information relevant to temperature directly from the source video (e.g., from color saturation or brightness) or video captured with a thermal camera that accompanies the main video to generate keyframes for video playback with an additional thermal output channel.

Although the definition of keyframes for a multitude of variables (e.g., audio volume, visual filters, transitions, etc.) have been implemented in related art video editing software, such implementations do not utilize keyframes that determine the temporal characteristics of a thermal output device during video playback. Example implementations may also automatically generate such keyframes for a thermal output channel for video playback.

Aspects of the present disclosure include a computer device, which can involve a processor, configured to execute a playback of a video on a display of a thermal output device; and during the playback of the video on the display of the thermal output device, instruct a thermal output device to adjust a temperature of the thermal output device based on thermal information associated with the video.

Aspects of the present disclosure can further include a method, involving executing a playback of a video on a display of a thermal output device; and during the playback of the video on the display of the thermal output device, instructing a thermal output device to adjust a temperature of the thermal output device based on thermal information associated with the video.

Aspects of the present disclosure can further include a non-transitory computer readable medium, storing instructions for executing a process, the instructions including executing a playback of a video on a display of a thermal output device; and during the playback of the video on the display of the thermal output device, instructing a thermal output device to adjust a temperature of the thermal output device based on thermal information associated with the video.

Aspects of the present disclosure include a computer device, which can involve a processor, configured to execute a playback of a video on a display of a haptic output device; and during the playback of the video on the display of the haptic output device, instruct a haptic output device to adjust a haptic feedback of the haptic output device based on haptic information associated with the video.

Aspects of the present disclosure include a method, which can involve executing a playback of a video on a display of a haptic output device; and during the playback of the video on the display of the haptic output device, instructing a haptic output device to adjust a haptic feedback of the haptic output device based on haptic information associated with the video.

Aspects of the present disclosure include a non-transitory computer readable medium, storing instructions for executing the process, the instructions can involve executing a playback of a video on a display of a haptic output device; and during the playback of the video on the display of the haptic output device, instructing a haptic output device to adjust a haptic feedback of the haptic output device based on haptic information associated with the video.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations of the present disclosure facilitate keyframe generation (e.g. manually, automatically or a combination thereof). In an example manual approach, the user can be provided with a user interface that facilitates the annotation of a source video with an additional thermal output channel, so that the video can be displayed with thermal haptic feedback.

Example implementations also involve an automatic approach that can analyze a source video and automatically generate a list of keyframes describing the properties of a video's potential thermal output channel.

Figure 1:
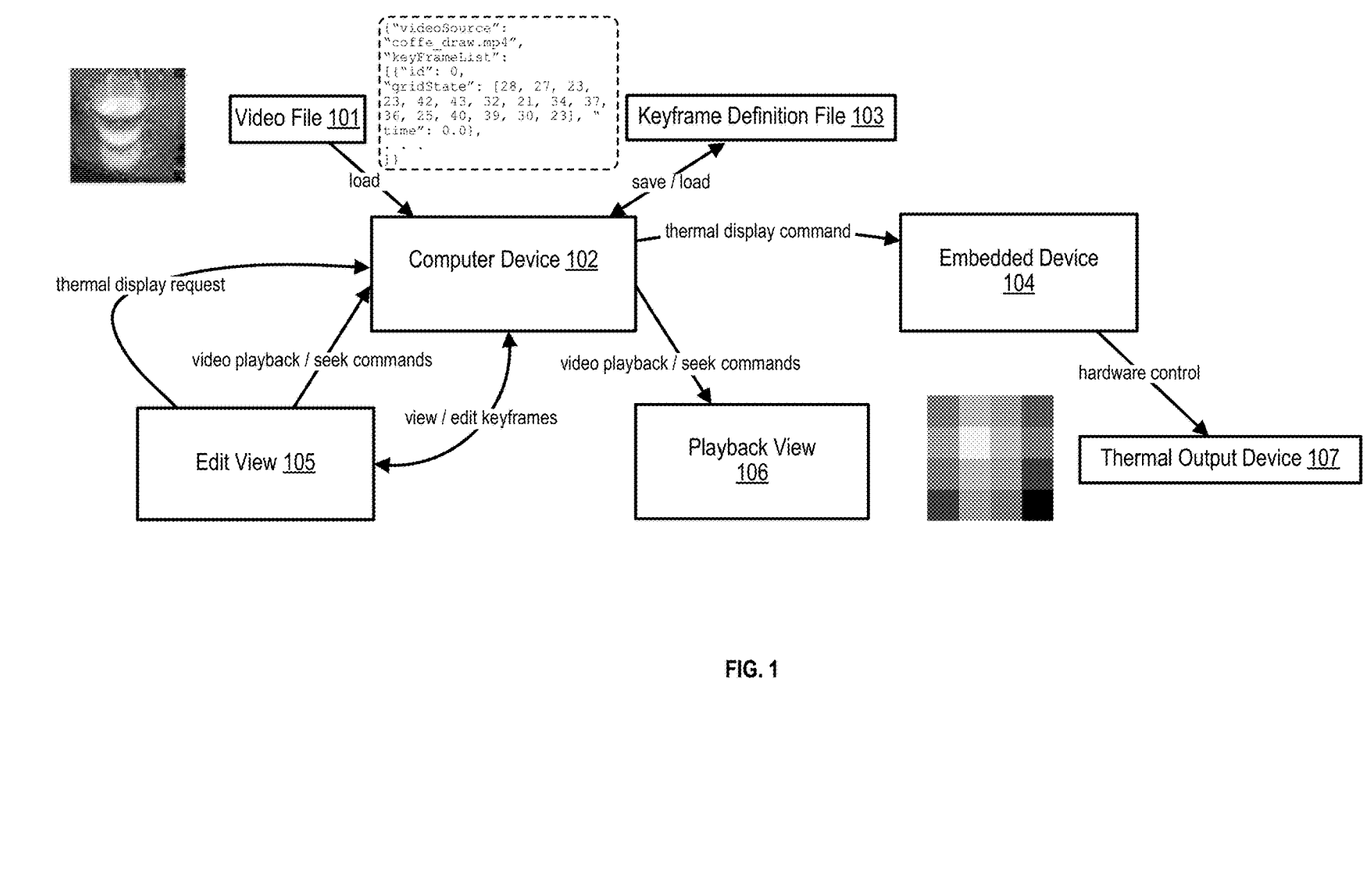
FIG. 1 illustrates an overview of a system in accordance with an example implementation.

FIG. 1 illustrates an overview of a system in accordance with an example implementation. In the example system of FIG. 1, there is a video file 101, a computer device 102, a keyframe definition file 103, an embedded device 104, an edit view interface 105, a playback view interface 106, and a thermal output device 107. In example implementations, computer device 102 loads video file 101, which can be in any format, depending on the desired implementation.

Computer device 102 is configured to save and load a corresponding keyframe definition file 103 for the video, which can be represented in JavaScript Object Notation (JSON) or in any other format, depending on the desired implementation. Computer device 102 is configured to provide an edit view interface 105, which can facilitate the one or more functions of keyframe viewing or editing, responses for video playback or seek commands, and responses for thermal display requests. Computer device 102 can also be configured to provide a playback view interface 106 which is configured to facilitate the execution of video playback or seek commands.

Embedded device 104 is configured to receive thermal display commands from computer device 102 to conduct hardware control on thermal output device 107, to increase or decrease the temperature of certain sections of the thermal output device as needed.

In example implementations, computer device 102 may be implemented in the form of a node.js server configured to allow clients to load edits and playback desired views. However other apparatuses may also be utilized or substituted therefor, depending on the desired implementation, and the present disclosure is not limited thereto. Computer device 102 can also be configured to save and load keyframe definition files 103 for use in the edit view interface 105.

Furthermore, the computer device 102 can be configured to handle requests for thermal output and to communicate the requests for thermal output to embedded device 104 via a network, a universal serial bus (USB) connection, or other methods depending on the desired implementation. Embedded device 104 may be in the form of any desired electronics platform or configuration according to the implementation that is configured to control the thermal output device 107.

In example implementations, a software architecture is implemented for the edit view interface 105 and playback view interface 106, to facilitate a user interface (UI) that can permit editing and playback of thermal annotations for a source video (e.g., simultaneously if desired). In example implementations, the UI can be web-based and provide the edit view interface 105 and the playback view interface 106 that can be run in two browser windows (e.g. simultaneously if desired). In an example implementation, one window can be used for editing on user equipment such as a personal computer (PC), mobile device or other desired devise, whereas the other window can be executed on a device with thermal output capabilities. The windows can be used in conjunction with each other to give an impression of facilitating simultaneous editing and playback, depending on the desired implementation.

Figure 2:
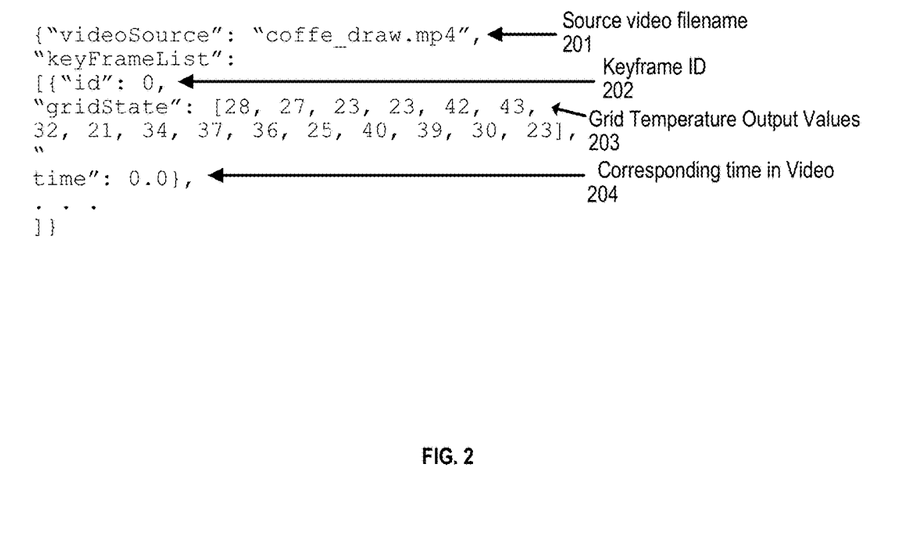
FIG. 2 illustrates an example keyframe definition file format in accordance with an example implementation.

FIG. 2 illustrates an example keyframe definition file format in accordance with an example implementation. In the example of FIG. 2, the keyframe definition file format can be in a JSON format that includes information regarding the source video filename 201, the keyframe identifier (ID) 202, the grid temperature output values 203, and the corresponding time in the video 204. The keyframe definition file format can be utilized as the format for the keyframe definition files 103. Other formats including other types of information can also be utilized in accordance with the desired implementation.

The source video filename 201 provides information regarding the name of the video source file. The keyframe ID 202 can indicate a unique identifier for each keyframe of the video. Grid temperature output values 203 is a list of temperature values that the grid may display, and the corresponding time in the video 204 indicates a time in the source video at which the defined temperature values must be set.

Although manual editing of keyframes offers flexibility, keyframes may be automatically generated for a thermal feedback channel from suitable source material. For example, video obtained from a thermal camera can be convertible via image processing to a stream of keyframes for a thermal feedback channel, as the thermal camera can directly encode thermal information from the IR spectrum. In example implementations, video from standard cameras can also be considered where there is an available interpretation of image properties as they relate to heat information. For example, videos of physical processes involving heat, e.g., a rocket engine firing, or a welding arc can emit large amounts of visible light. Such brighter pixels can be used to generated thermal feedback information. Similarly, the flames of certain chemical elements have a distinct spectral hue. Such correspondences to known image properties may be derived manually, through pattern recognition or other machine learning, or through other methods depending on the desired implementation.

Figure 3:
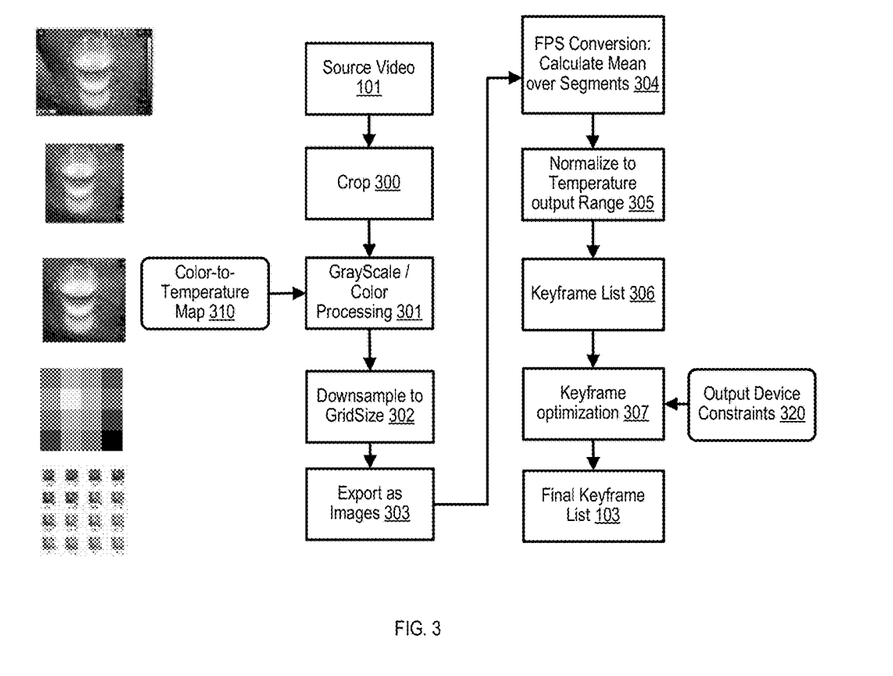
FIG. 3 illustrates an example algorithm to automatically generate a sequence of keyframes for a thermal feedback channel, in accordance with an example implementation.

FIG. 3 illustrates an example algorithm to automatically generate a sequence of keyframes for a thermal feedback channel, in accordance with an example implementation. At 300, if necessary, the source video 101 is cropped such that the aspect ratio matches that of the thermal grid.

At 301, image processing is applied to video, to extract grayscale or other pixel-level meta data, e.g., hue, saturation, brightness, luminance. The video can be in the form of a temporal sequence of images, and the images can be in any form depending on the desired implementation. As an alternative to greyscale conversion, the flow can also utilize a predefined color-to-temperature map 310 that maps color to heat information that is domain-appropriate with respect to the source video 101. That is, instead of grayscale conversion, a predefined mapping can be utilized in example implementations that maps color values to heat output when the domain of the source video is known. For instance, if a landscape scene is shown, an appropriate color mapping that maps blue color tones (e.g., water, sky) to a cool temperature and green and brown color tones to warmer temperature (e.g, trees and soil) can be utilized for determining appropriate temperatures for the video. Such example implementations can also be expanded by using semantic processing of the image contents, (e.g., via deep learning, machine learning) to classify and segment image contents in order to determine the appropriate temperature values for scene elements. The color to temperature mapping 310 can thereby be derived by any methods according to the desired implementation, such as through domain knowledge, machine learning, or other methods.

At 302, a mapping operation (e.g., subsampling) is conducted to map the number of pixels of the video to the grid of the thermal output device. At 303, the individual frames are output as images, such as bitmap images or other images depending on the desired implementation. At 304, framerate conversion is conducted by calculating a mean or average value for each grid cell over groups of images to achieve a desired refresh rate for the thermal output device. At 305, the calculation is utilized to normalize the temperature data according to the thermal output capabilities of the thermal output device. At 306, a keyframe list is generated in the desired format as illustrated, for example in FIG. 2.

At 307 the keyframe list is optimized based on the desired processing, which can incorporate, for example, output device limitations or constraints 320 of the thermal output device. In example implementations, the keyframe list can be post-processed for further optimization. As the keyframe list generated at 306 may be in a constant time interval, example implementations can apply methods to remove redundant keyframes (e.g., multiple keyframes in a sequence where temperature differences are minimal or within a threshold).

In example implementations, redundancy removal can be realized algorithmically by measuring the cumulative difference $$D_{i,j} = \Sigma_{n=i+1}^{j} \|K_n - K_{n-1}\|$$

Given a keyframe list $K_1, K_2, \ldots, K_m$ with $m \in \mathbb{N}$, then if $D_{i,j}$ for any $j>i$ were to exceed some threshold E, example implementations can then eliminate keyframes $K_{i+1}$ to $K_{j-1}$.

Device constraints 320 can also be utilized in accordance with the desired implementation. For instance, if the thermal output device cannot produce the required thermal characteristic (e.g., output temperature, temperature difference, or temperature change rate), or is limited by human factors issues (e.g, maximum/minimum safe temperatures, temporal integration of sensory perceptions) keyframes can be moved around into a later time (e.g., if there is no collision with a following setting), or rewritten to reflect the heating or cooling performance of the thermal output device. In example implementations, device constraint information can also be incorporated at playback time, thereby maintaining the generated keyframe list across all types of thermal output devices.

Figure 4A:
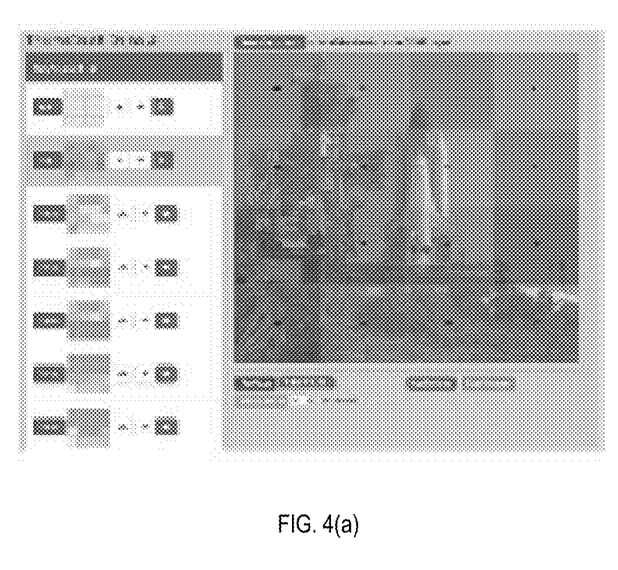
FIGS. 4(a) and 4(b) illustrate an example interface for manual keyframe editing, in accordance with an example implementation.
Figure 4B:
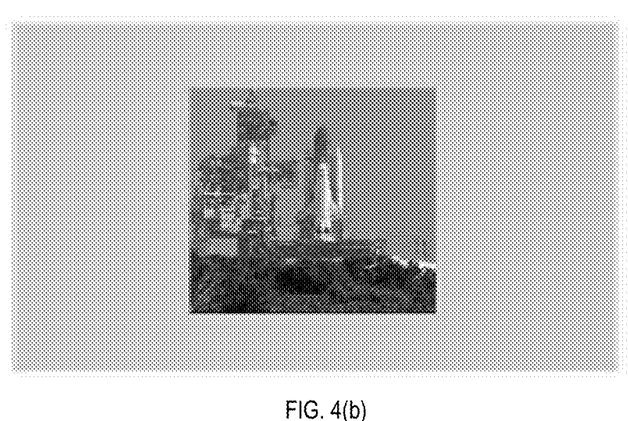

The generated keyframe list 103 can be used to play back the thermal channel using the interface as illustrated in FIGS. 4(a) and 4(b), and through the thermal output device.

FIGS. 4(a) and 4(b) illustrate an example interface for manual keyframe editing, in accordance with an example implementation. As illustrated in FIG. 4(a), an example edit view interface 105 of FIG. 1 is configured to allow the user to define the thermal output temperatures using a grid that is overlaid on the source video. Each grid cell corresponds to a heater/cooler cell on a thermal output device. As illustrated in FIG. 4(b), an example playback view interface 106 is subordinate to the edit view, to allow playback of the video without editor user interface (UI) components on a thermal output device.

In the example of FIGS. 4(a) and 4(b), there is a UI for manual keyframe editing for a thermal output channel accompanying video playback. The UI shows a grid overlaying the video in FIG. 4(a) to be annotated with a thermal output channel. Through mouse drags or other input methods (e.g. touch screen) in individual grid cells, the user can set temperatures that lie within a thermal output device's temperature output range. Video can be played back using the interface, or scrolled to a given timestamp using a slider bar. Keyframes can be added using an "add keyframe" button or other user interface implementation. Added keyframes can be provided in a list form, where the keyframes can be selected, reordered or deleted, or in other forms in accordance with a desired implementation. Once finished with editing, the user can save the generated keyframe list as a JSON file as illustrated in FIG. 2.

In the example of FIG. 4(a), the edit view interface can control video playback in the playback view through web socket events that are mediated by a webserver. The edit view interface can also utilize the keyframes to couple thermal output on a thermal output device to time information obtained during video playback. For example, the edit view interface can be configured to send requests to the computer device to display the appropriate thermal information on the thermal output device in accordance with the present video timestamp.

In the example of FIG. 4(b), the playback view interface is configured to be provided onto a thermal output device. In the example of FIG. 4(b), the playback view interface provides the video, removes all UI elements, and can be remotely controlled through the edit view interface 105 through web sockets or other connection methods.

In example implementations, camera input images (IR or standard images) may not be the only way of generating temporal thermal information to accompany a video. For example, body-worn sensors (e.g., skin temperature, skin resistance, pulse) on actors in a video can also be used to generate streams of thermal data to be rendered in a video. Another example implementation involves the use of telemetry sensors (e.g., engine revolutions per minute (RPM), brake temperature, exhaust gas temperature, fuel level, etc.) from vehicles shown in the video. In another example implementation, the rendering of thermal video can be realized by segmenting the source videos into persistent regions (e.g., via deep learning or a manual process) and then mapping a sensor stream to temperature values of a particular region. Other methods for generating thermal information for a video can also be utilized in accordance with the desired implementation and the present disclosure is not limited thereto.

In example implementations, there is a temperature profile function for temperature changes. The temperature profile function is utilized to define the behavior of the thermal output device when changing from one keyframe to another. Thermal output devices with closed-loop control can use a proportional-integral-derivative (PID) controller to regulate device power to effect temperature changes when displaying a new keyframe. However, such devices can be more technically complex to build than devices with open-loop control, due to the overhead (e.g., wiring, powering, addressing) of adding multiple temperature sensors to the electronics design.

In example implementations, open-loop devices can be utilized to precisely set a desired temperature. When the relationship of input power (in W) and the temperature at the surface of the device is measured, a mapping (e.g. linear) fits for the data ($R^2$=0.99). However, applying the linear mapping directly can result in slow response times for temperature changes, as the full output power for heating or zero output power for cooling may not be applied in such a manner.

Thus, example implementations described herein apply a temperature profile function to provide full power or zero power temperature ramp for heating and cooling, respectively, for an estimated temperature ramp (up/down) duration, and then, after a delay, revert to the power setting required by the linear power-to-temperature mapping to maintain the desired final temperature. To obtain the profile function, an additional measurement step can be conducted to obtain the maximum heating and cooling rates for the thermal output device, $S_{Heat}$ and $S_{cool}$ in C/s.

Figure 5:
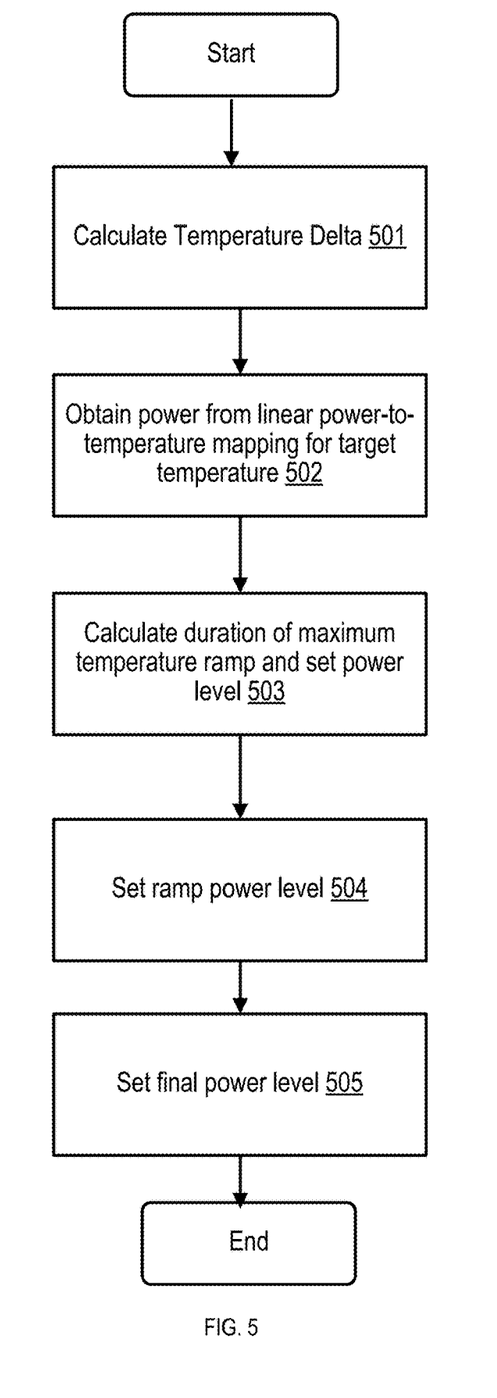
FIG. 5 illustrates a flow diagram for a temperature profile function of a thermal output device, in accordance with an example implementation.

FIG. 5 illustrates a flow diagram for a temperature profile function of a thermal output device 107, in accordance with an example implementation. The example temperature profile function can be executed, for example, in embedded device 104 or by computer device 102 configured to send instructions to embedded device 104, depending on the desired implementation. The temperature profile function $P_{gridX,gridY,t0,t1}(s)$ (where s is a variable representing time with t0<=s<=t1) for changing from currentTemp to targetTemp for a grid cell at (gridX, gridY) is calculated using the flow as follows. At 501, the temperature profile function calculates the temperature delta: tDiff=targetTemp−currentTemp. At 502, the temperature profile function obtains finalPower from linear power-to-temperature mapping for targetTemp. At 503, if tDiff>=0, the temperature profile function calculates the duration in ms of the maximum temperature ramp, and set the power level as follows:

1. Calculate temperature delta: $t_{diff}=t_1-t_0$.
2. Obtain final power setting $p_1$ for $t_1$ from the linear power-to-temperature mapping of $t_1$.
3. if $t_{diff}>=0$ calculate temperature ramp duration $S_{ramp}$ in ms and power setting $p_{ramp}$ as follows:

$s_{ramp}=t_{diff}/S_{heat}*c_{ramp}$ $p_{ramp}=qP_{max}$ 4. if, on the other hand $t_{diff}<0$:

$s_{ramp}=t_{diff}/S_{cool}*c_{ramp}$ $p_{ramp}=0$ $c_{ramp} \in (0, 1)$ is a coefficient that acts as a safety buffer that reduces the ramp time in order to limit the chance of overshooting (while effecting a positive temperature change) or undershooting (while effecting a negative tempeture change) the desired target temperature. The power profile function can thus be defined as:

$$P_{gridX,gridY,t0,t1}(s) = \begin{cases} p_{ramp} & 0 \leq s \leq s_{ramp} \\ p_1 & s > s_{ramp} \end{cases}$$

At 504, the temperature profile function sets the ramp power level as a function of the calculated rampPower, and the grid of the thermal output device: setPowerLevel(gridX, gridY, rampPower). At 505, the temperature profile function sets the final power level after ramp time delay: setRampPowerDelayed(gridX, gridY, finalPower, rampDuration).

rampTimeCoeff$\in$(0,1) is a value designed as a safety buffer that reduces the ramp time in order to limit the chance of overshooting (while effecting a positive temperature change) or undershooting (while effecting a negative temperature change) the desired target temperature.

Figure 6A:
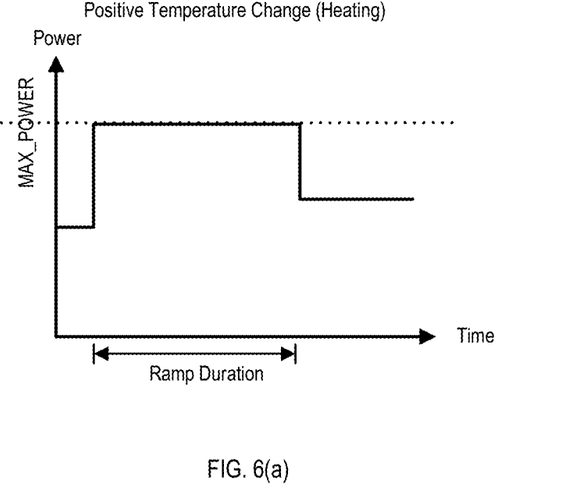
FIGS. 6(a) and 6(b) illustrate the profile functions for heating and cooling, in accordance with an example implementation.
Figure 6B:
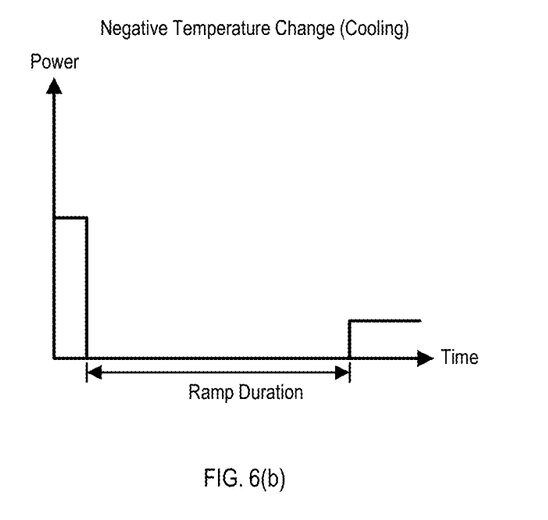

FIGS. 6(a) and 6(b) illustrate the profile functions for heating and cooling, in accordance with an example implementation. Specifically, FIGS. 6(a) and 6(b) illustrate power profiles for positive temperature change (FIG. 6(a)) and negative temperature change (FIG. 6(b)) on thermal output devices with open loop control.

Figure 7:
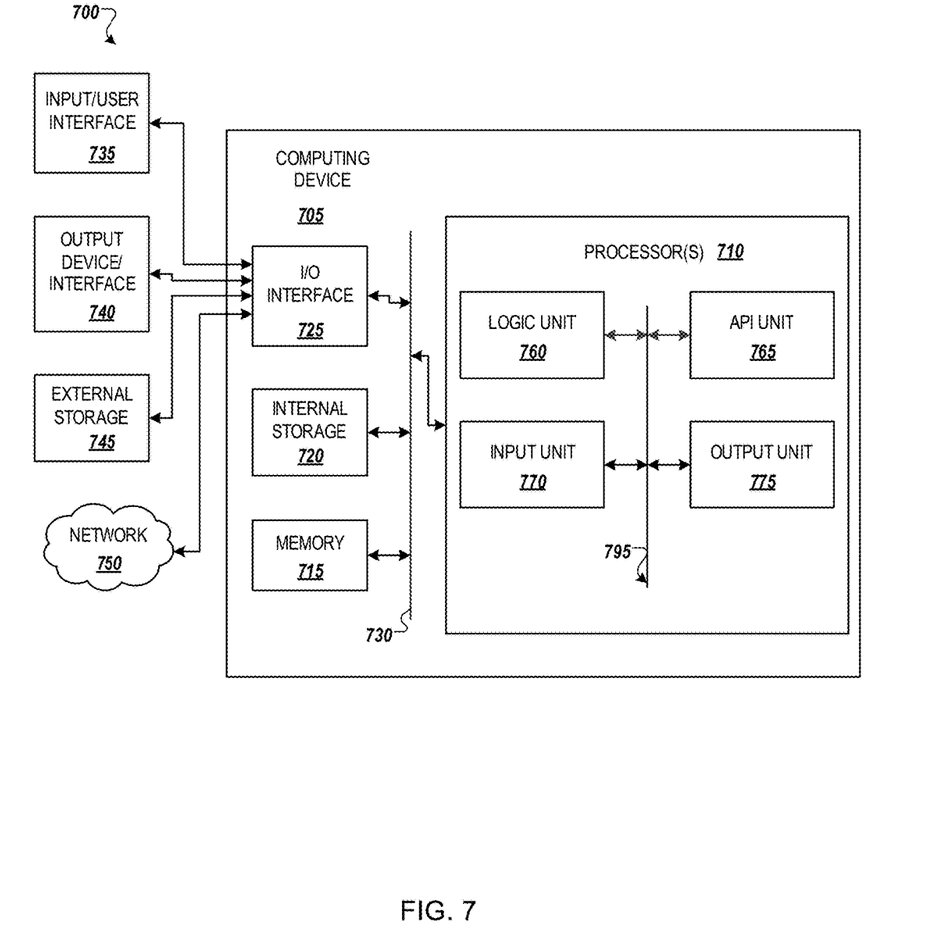
FIG. 7 illustrates an example computing environment with an example computer device suitable for use in example implementations.

FIG. 7 illustrates an example computing environment with an example computer device suitable for use in example implementations. For example, the example computer device outlined below can be utilized as computer device 102 as described in FIG. 1 to facilitate the edit view interface 105 and provide a playback view interface 106. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 715 may be configured to store or manage a database of mappings of haptic feedback to pixels characteristics. In such an example implementation, Memory 715 may be configured to function as an archive for haptic feedback to pixels characteristics (e.g. greyscale intensity, color intensity) that are generated by any methods according to the desired implementation. Memory 715 can also be utilized to store haptic feedback information for a video. The mappings and haptic feedback information can be processed by processor(s) 710 according to example implementations as described below. The example implementations as described herein may be conducted singularly, or in any combination of each other according to the desired implementation and are not limited to a particular example implementation.

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to execute a playback of a video on a display of a thermal output device as illustrated in FIG. 4(*b*); and during the playback of the video on the display of the thermal output device, instruct a thermal output device to adjust a temperature of the thermal output device based on thermal information associated with the video as illustrated in FIGS. 4(*a*) and 4(*b*). Thermal information can be in the form of a keyframe definition file as illustrated in FIG. 2, sensor information of an IR camera or other thermal sensors associated with a video, or other information indicative of temperature for the video depending on the desired implementation.

Processor(s) 710 can also be configured to generate the thermal information for the video based on a processing of the video. The processing of the video can include applying a temperature map to the video to determine one or more temperatures for one or more frames of the video; normalizing the one or more temperatures based on the thermal output device; and determining keyframes of the video based on the one or more temperatures for the one or more frames of the video as illustrated in the flow diagram of FIG. 3. The temperature map can involve a mapping between temperature and one of pixel color and greyscale intensity through either a color to temperature map as described in FIG. 3, or through scaling of temperature based on brightness of the pixels, or through other methods depending on the desired implementation. In example implementations, the number of temperature frames can differ from the number of frames in the video if desired.

Processor(s) 710 is configured to adjust the temperature of the thermal output device by determining a temperature delta between a current temperature of a portion of the thermal output device and a target temperature; determining a power level of the target temperature for the portion of the thermal output device based on a power to temperature mapping of the thermal output device; determining a duration of a temperature ramp based on the temperature delta and characteristics of the thermal output device; and instructing the thermal output device to engage a heating mechanism or a cooling mechanism according to the power level and the duration of the temperature ramp for the portion of the thermal output device as described in FIG. 5. Instructions can be transmitted from processor(s) 710 to embedded device 104 to control the thermal output device 107. In another example implementation, some or all of the flow of FIG. 5 may be executed by embedded device 104 depending on the desired implementation. The characteristics of the thermal output device can include information regarding time required for the thermal output device to increase or decrease the temperature by a temperature delta, or from a first temperature to a second temperature, based on the heating or cooling mechanism utilized by the thermal output device, the surface area of each pixel of the thermal output device, the temperature of the cooling mechanism, and so on, depending on the desired implementation.

Processor(s) 710 is configured to provide an interface configured to provide an indication of the thermal information for a selected portion of the video, and to adjust the thermal information based on input made to the interface as illustrated in FIG. 4(*a*). The interface is configured to adjust the thermal information for a selected portion of the thermal output device based on the input made to the device, wherein the portion is selected through the interface as shown in FIG. 4(*a*). As illustrated in FIG. 4(*a*), the temperature of grids of the thermal output device 107 may be adjusted during the editing and the playback of the video through the provided interface of FIG. 4(*a*).

Figure 8:
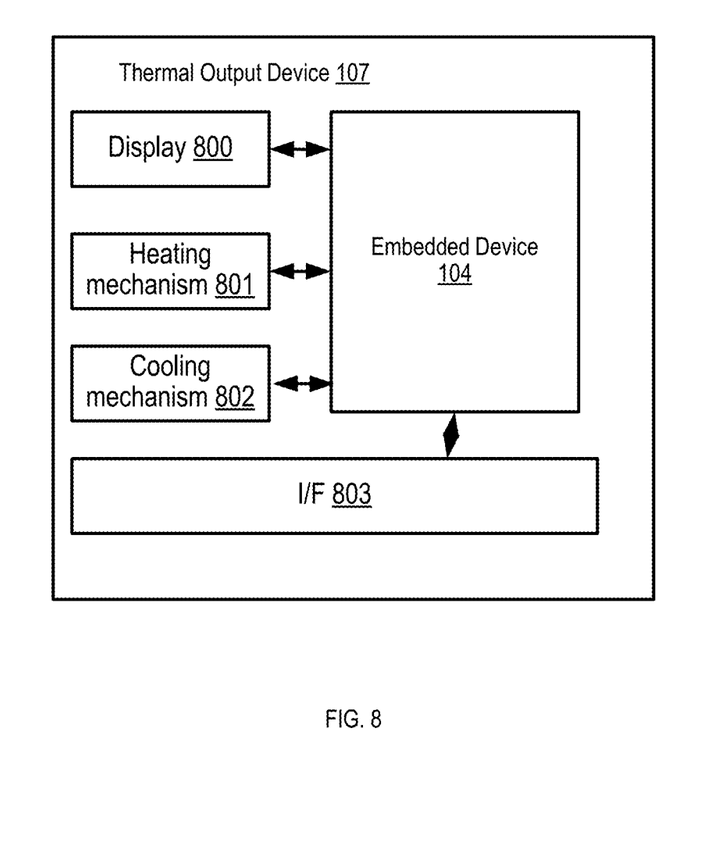
FIG. 8 illustrates an example thermal device upon which example implementations can be applied.

FIG. 8 illustrates an example thermal device upon which example implementations can be applied. In the example of FIG. 8, thermal output device 107 can include a display element 800, a heating mechanism 801, a cooling mechanism 802, embedded device 104 and an interface (I/F) 803.

In example implementations, display element 800 is made of a substrate that can be divided into grids for heating and cooling. The display element 800 can be made to display videos either through using a projector element, or can be transmitted from the computer device 102 to the display element 800 for displaying via embedded device 104 and I/F 803.

Heating mechanism 801 can include any heating element that can be configured to heat the display element 800, such as any electro-resistive heating element configured to convert current into heat. In an example implementation, a printed circuit board (PCB) can be utilized with a grid of conductive heating spirals (e.g. copper). In one example implementation the traces for each spiral are copper and printed into heating cells. In an example configuration, a 20 V heating cell can be configured to put out roughly 40 W in heat. However, other heating mechanisms can also be employed and the present disclosure is not limited thereto.

Cooling mechanism 802 can include any cooling element that can be configured to cool the display element 800 or the heating mechanism 801, such as any liquid, solid, or gas coolant systems or fan arrays. In an example implementation for cooling, a PCB imprinted with heater coils is placed on top of a cooling manifold. When current to a heater coil at a grid location is switched off, the PCB is cooled through liquid coolant. A pump circulates liquid coolant through cooling equipment and through the manifold. The coolant is used to extract excess heat from the grid when cooling is desired. By balancing the cooling effect of the manifold with heat input from the heating coils in the grid, arbitrary temperatures can be set at any point on the grid. In an example implementation, cooling mechanism 802 uses water cooled to a desired temperature (e.g. roughly three degrees Celsius) as liquid coolant. Water is pumped from a water reservoir containing water to an aquarium chiller unit, which is used to cool the water. The outlet of the chiller unit can be connected to an input port of the cooling manifold. To evenly disperse coolant, the manifold can include coolant outlets arranged in opposite corners. Outflow from the coolant outlets can be piped back to the reservoir, where the cooling cycle begins anew.

Embedded device 104 can be configured to actively control the heating mechanism 801 and the cooling mechanism 802 during operation. In an example implementation, each cell in the heating grid has an associated MOSFET (metal oxide semiconductor field-effect transistor) that switches current onto the heater spiral of the cell. The gates of the MOSFETs can be driven by a PWM controller shield to drive the gates of the MOSFETs. Embedded device 104 can be implemented as control logic (e.g. field programmable gate arrays, processors) to send commands to the PWM controller shields via a bus connection. Embedded device 104 can also communicate to computer device 102 through I/F 803 (e.g. via USB) so that interactive applications can make use of the thermal output device 107. However, other implementations are also possible, depending on the desired implementation of the heating mechanism 801, cooling mechanism 802 and display element 800. In another example implementation, embedded device 104 can be an FPGA configured to drive the desired cooling mechanism 802 or heating mechanism 801.

Although example implementations herein are directed to thermal devices and thermal output, the example implementations can be extended to other haptic feedback, such as electro-vibration, ultrasonic feedback, pressure, or other haptic output depending on the desired implementation. Thus, example implementations can be extended to apply video processing and keyframing to generate mappings for frames or pixels for the desired haptic feedback. In an example implementation, pixel intensity can be mapped to various degrees of electro-vibration, pressure feedback, vibration feedback, and so on, depending on the desired implementation.

In such example implementations, the processor(s) 710 can be configured to generate the haptic information for the video based on a processing of the video. The processing of the video can involve applying a haptic feedback mapping to the video to determine a plurality of levels of haptic feedback for a corresponding plurality of frames of the video; normalizing the plurality of levels of haptic feedback based on the haptic output device; and determining keyframes of the video based on the plurality of levels of haptic feedback for the corresponding plurality of frames of the video. The haptic feedback mapping can involve a mapping between the level of haptic feedback and at least one of pixel color and greyscale intensity by extending the implementations of FIG. 3 according to the type of haptic feedback and the desired implementation.

In example implementations, the processor(s) 710 can be configured to adjust the haptic feedback of the haptic output device by determining a haptic feedback level delta between a current haptic feedback level of a portion of the haptic output device and a target haptic feedback level, determining a power level of the target haptic feedback level for the portion of the haptic output device based on a power to haptic feedback level mapping of the thermal output device; determining a duration of a haptic feedback level ramp based on the haptic feedback level delta and characteristics of the haptic output device; and instructing the haptic output device to engage a haptic feedback mechanism according to the power level and the duration of the haptic feedback level ramp for the portion of the haptic output device based on an extension of the implementations of FIG. 5 according to the type of haptic feedback and the desired implementation. The characteristics of the haptic output device can include information regarding time required for the haptic output device to increase or decrease the haptic feedback level by a haptic feedback level delta, or from a first level to a second level, based on the mechanism utilized by the haptic output device to facilitate haptic feedback, the surface area of each pixel of the haptic output device, and so on, depending on the desired implementation.

Processor(s) 710 can also be configured to provide an interface configured to provide an indication of the haptic feedback level for a selected portion of the video, and to adjust the haptic feedback level based on input to the interface. For example, in a tactile or pressure feedback device, the haptic output device can provide tactile or pressure feedback output according to the level indicated by the haptic feedback level.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A computer device, comprising:
a processor, configured to:
execute a playback of a video on a display associated with a thermal output device; and
during the playback of the video on the display associated with the thermal output device, provide an instruction to the thermal output device to adjust a temperature of one or more portions of the thermal output device based on thermal information associated with the video, the thermal output device configured to engage a heating mechanism for the instruction to the thermal output device indicative of heating one or more portions of the display based on the thermal information, and a cooling mechanism for the instruction to the thermal output device indicative of cooling one or more portions of the display based on the thermal information.

2. The computer device of claim 1, wherein the processor is configured to:
generate the thermal information for the video based on a processing of the video, the processing of the video comprising:
applying a temperature mapping to the video to determine one or more temperatures for one or more of frames of the video;
normalizing the one or more temperatures based on the thermal output device; and
determining keyframes of the video based on the one or more temperatures for the corresponding plurality of frames of the video.

3. The computer device of claim 2, wherein the temperature mapping comprises a mapping between the temperature and at least one of pixel color and greyscale intensity.

4. The computer device of claim 1, wherein the processor is configured to adjust the temperature of at least a portion of the thermal output device by:
determining a temperature delta between a current temperature of the at least the portion of the thermal output device and a target temperature;
determining a power level of the target temperature for the at least the portion of the thermal output device based on a power to temperature mapping of the thermal output device;
determining a duration of a temperature ramp based on the temperature delta and characteristics of the thermal output device; and
instructing the thermal output device to engage the heating mechanism or the cooling mechanism according to the power level and the duration of the temperature ramp for the at least the portion of the thermal output device.

5. The computer device of claim 1, wherein the processor is configured to:
provide an interface configured to provide an indication of the thermal information for a selected portion of the video, and to adjust the thermal information based on input to the interface.

6. The computer device of claim 5, wherein the interface is configured to adjust the thermal information for a selected portion of the thermal output device based on the input to the computer device, wherein the portion is selected through the interface.

7. A method, comprising:
executing a playback of a video on a display associated with a thermal output device; and
during the playback of the video on the display associated with the thermal output device, providing an instruction to the thermal output device to adjust a temperature of the thermal output device based on thermal information associated with the video, the thermal output device configured to engage a heating mechanism for the instruction to the thermal output device indicative of heating one or more portions of the display based on the thermal information, and a cooling mechanism for the instruction to the thermal output device indicative of cooling one or more portions of the display based on the thermal information.

8. The method of claim 7, further comprising:
generating the thermal information for the video based on a processing of the video, the processing of the video comprising:
applying a temperature mapping to the video to determine a one or more temperatures for one or more frames of the video;
normalizing the one or more temperatures based on the thermal output device; and
determining keyframes of the video based on the one or more temperatures for the corresponding one or more frames of the video.

9. The method of claim 8, wherein the temperature mapping comprises a mapping between the temperature and at least one of pixel color and greyscale intensity.

10. The method of claim 7, wherein the adjusting the temperature of at least a portion of the thermal output device comprises:
determining a temperature delta between a current temperature of the at least the portion of the thermal output device and a target temperature;
determining a power level of the target temperature for the portion of the thermal output device based on a power to temperature mapping of the thermal output device;
determining a duration of a temperature ramp based on the temperature delta and characteristics of the thermal output device; and
instructing the thermal output device to engage the heating mechanism or the cooling mechanism according to the power level and the duration of the temperature ramp for the at least the portion of the thermal output device.

11. The method of claim 7, further comprising:
providing an interface configured to provide an indication of the thermal information for a selected portion of the video, and to adjust the thermal information based on input to the interface.

12. The method of claim 11, wherein the interface is configured to adjust the thermal information for a selected portion of the thermal output device based on the input to a computer device, wherein the portion is selected through the interface.

13. A non-transitory computer readable medium, storing instructions for executing a process, the instructions comprising:
executing a playback of a video on a display associated with a thermal output device; and
during the playback of the video on the display associated with the thermal output device, providing an instruction to the thermal output device to adjust a temperature of the thermal output device based on thermal information associated with the video, the thermal output device configured to engage a heating mechanism for the instruction to the thermal output device indicative of heating one or more portions of the display based on the thermal information, and a cooling mechanism for the instruction to the thermal output device indication of cooling one of more portions of the display based on the thermal information.

14. The non-transitory computer readable medium of claim 13, the instructions further comprising:
generating the thermal information for the video based on a processing of the video, the processing of the video comprising:
applying a temperature mapping to the video to determine one or more temperatures for one or more frames of the video;
normalizing the one or more temperatures based on the thermal output device; and
determining keyframes of the video based on the one or more temperatures for the one or more frames of the video.

15. The non-transitory computer readable medium of claim 14, wherein the temperature mapping comprises a mapping between the temperature and at least one of pixel color and greyscale intensity.

16. The non-transitory computer readable medium of claim 13, wherein the instructions for adjusting the temperature of at least a portion of the thermal output device comprises:
determining a temperature delta between a current temperature of the at least the portion of the thermal output device and a target temperature;
determining a power level of the target temperature for the at least the portion of the thermal output device based on a power to temperature mapping of the thermal output device;
determining a duration of a temperature ramp based on the temperature delta and characteristics of the thermal output device; and
instructing the thermal output device to engage the heating mechanism or the cooling mechanism according to the power level and the duration of the temperature ramp for the at least the portion of the thermal output device.

17. The non-transitory computer readable medium of claim 13, further comprising:
providing an interface configured to provide an indication of the thermal information for a selected portion of the video, and to adjust the thermal information based on input to the interface.

18. The non-transitory computer readable medium of claim 13, wherein the interface is configured to adjust the thermal information for a selected portion of the thermal output device based on the input to a computer device, wherein the portion is selected through the interface.

* * * * *